United States Patent [19]

Ichikawa

[11] Patent Number: 5,873,700
[45] Date of Patent: Feb. 23, 1999

[54] HYDRAULIC MACHINE

[75] Inventor: Hitoshi Ichikawa, Iwaki, Japan

[73] Assignee: Hitachi, Ltd., Tokyo, Japan

[21] Appl. No.: 788,293

[22] Filed: Jan. 24, 1997

[30] Foreign Application Priority Data

Jan. 26, 1996 [JP] Japan .................................. 8-011880

[51] Int. Cl.⁶ .................................................. F01D 9/04
[52] U.S. Cl. ......................... 415/200; 415/160; 415/161; 415/164
[58] Field of Search .................... 415/159, 160, 415/161, 163, 162, 164, 200, 217.1; 416/241 R

[56] References Cited

U.S. PATENT DOCUMENTS

| | | | |
|---|---|---|---|
| 1,755,321 | 4/1930 | Hendrickson | 415/217.1 |
| 2,291,110 | 7/1942 | Sharp | 415/161 |
| 3,512,899 | 5/1970 | Lindquist | 415/160 |
| 3,995,971 | 12/1976 | White | 415/160 |
| 4,492,522 | 1/1985 | Rossmann et al. | 415/200 |
| 5,601,411 | 2/1997 | Usami et al. | 415/200 |

FOREIGN PATENT DOCUMENTS

| | | | |
|---|---|---|---|
| 54-38450 | 3/1979 | Japan | 415/200 |
| 58-187584 | 11/1983 | Japan | 415/200 |

*Primary Examiner*—Christopher Verdier
*Attorney, Agent, or Firm*—Fay, Sharpe, Beall, Fagan, Minnich & McKee

[57] ABSTRACT

An earth and sand wear resisting hydraulic machine disposed in pressurized water and having movable guide vanes, has a wear resisting material against earth and sand applied by spraying or welding to the front end of a vane body of each guide vane, to the surface of a vane body portion located below the center of a water flowing portion of the vane body and to upper and lower end faces of the vane body. Consequently, the guide vanes and end faces are protected against wear caused by earth and sand.

9 Claims, 6 Drawing Sheets

HYDRAULIC MACHINE

BACKGROUND OF THE INVENTION

1. Field of the Invention

The present invention relates to a hydraulic machine such as a water turbine or a pump turbine. In particular, the invention is concerned with a hydraulic machine applicable also to water containing earth and sand.

2. Description of the Related Art

In hydraulic power generation, water energy created by utilizing the difference between upper and lower water levels is converted into rotational energy by means of a water turbine, and the rotational energy is then converted into electric energy by means of a generator. Recent proportions of atomic power generation and thermal power generation are not less than 80%. However, these power generation methods are inferior from the standpoint of a quick response characteristic. It is hydraulic power generation that is best used to achieve a quick response characteristic.

In pumping-up power generation, which is a hydraulic power generation, water at a lower point or elevation is pumped up into an upper pond through a pump by means of an electric motor utilizing night dump power to store energy, and the water thus pumped up during the night is utilized during the daytime to provide a required amount of electric power. Such a type of a hydraulic machine will hereinafter be referred to as a "pump turbine". Since natural water is utilized, the problem of earth and sand mixed in water energy, or pressurized water, is incidental to hydraulic power generation. Earth and sand mixed in pressurized water strike strongly against the water flowing portion of a water turbine and cause wear of components of the water turbine, which wear may result in damage and eventually inoperativeness of the water turbine. Therefore, a keen desire exists for the development of water turbine components which can resist wear even in collision with earth and sand and also for the attainment of promptness in the replacement of components.

The material of guide vanes so far adopted generally in water turbines and pump turbines corresponds to JIS (Japanese Industrial Standard) SC450 Carbon Steel Castings or JIS-SCS1 Stainless Steel Castings. This material is subject to wear when it collides with earth and sand. As a result of the wear or damage caused by earth and sand, it is periodically required to disassemble the whole of a generator and replace the guide vanes with new ones or repair the old ones, by welding, portions which have been damaged by earth and sand.

However, in repair by welding, the guide vane shafts are bent by the heat of welding and hence it is necessary to transport the guide vanes from the power plant to a machine shop and subject them to machining again. Thus, also in the replacement of guide vanes with new ones or in the repair by welding, a large amount of cost and a long period of time have so far been needed.

Moreover, it has heretofore been necessary for a guide vane operating mechanism in a water turbine or a pump turbine to use a thrust bearing ring for bearing the weight of each guide vane and also for bearing an upward water pressure acting on the guide vane. More particularly, each guide vane is disposed movably between stationary upper and lower covers and it is necessary to provide clearances between the guide vane and those covers. For ensuring those clearances there has been used a strong thrust bearing ring. When passing through the said guide vane clearances, pressurized water increases its flow velocity and strikes violently against upper and lower end faces of the vane portion of the guide vane and also against upper and lower facing plates attached respectively to the upper and lower covers, causing wear which is attributable to earth and sand contained in the pressurized water.

Further, the pressure water leaks from the guide vane clearances and causes deterioration in operation efficiency of the water turbine. In the pump turbine, guide vanes are fully closed during operation of the pump and the water level in a runner chamber is depressed by compressed air. But pressure water from the casing side leaks through the guide vane clearances and strikes against the runner which is rotating in air, thus resulting in that the electric motor for rotating the runner is required to be provided with a large input.

Additionally, the upper and lower casings are apt to cause wear and damage in the guide vane clearances due to collision with earth and sand and when they are to be replaced with new ones, it is necessary to disassemble the whole of both the generator and the water turbine. Accordingly, a very long period is needed for such entire disassembly, replacement of the upper and lower facing plates and the subsequent entire assembly.

Thus, according to the prior art, the components which come into contact with pressurized water containing earth and sand are difficult to be resistant to the pressurized water, and the whole of the generator must be disassembled for the repair of guide vanes and for the replacement of facing plates. During this disassembly, the supply of electric power is interrupted and thus there has been a problem in power transmission system and electric power management.

SUMMARY OF THE INVENTION

The present invention has been accomplished in view of the above-mentioned problems and it is an object of the invention to provide a hydraulic machine capable of fully protecting the components in contact with pressurized water containing earth and sand against wear caused by the earth and sand and thereby capable of attaining a highly reliable power transmission system and electric power management.

According to the present invention, in order to achieve the above-mentioned object, there is provided a hydraulic machine disposed in pressurized water and equipped with movable guide vanes, in which an earth and sand wear resisting material is sprayed or welded to the front end of a vane body of each guide vane, to the surface of a vane body portion located below the center of a water flowing portion of the vane body and further to upper and lower end faces of the vane body.

According to the present invention, moreover, not only an earth and sand wear resisting material is sprayed or welded to the front end of a vane body of each guide vane, to the surface of a vane body portion located below the center of a water flowing portion of the vane body and further to upper and lower end faces of the vane body, but also an earth and sand wear resisting material softer than the said wear resisting material for the guide vane is sprayed or welded to the stationary-side surfaces opposed to the upper and lower end faces of the vane body.

Further, according to the present invention, not only an earth and sand wear resisting material is sprayed or welded to the front end of a vane body of each guide vane, to the surface of a vane portion located below the center of a water flowing portion of the vane body and further to upper and lower end faces of the vane body, but also an earth and sand wear resisting material softer than the said wear resisting material for the guide vane is sprayed or welded to stationary-side surfaces opposed to the upper and lower end faces of the vane body, and both the earth and sand wear resisting material applied to the upper and lower end faces of the vane body and the earth and sand wear resisting material applied to the stationary-side surfaces come into sliding contact with each other.

Further, according to the present invention, not only an earth and sand wear resisting material is sprayed or welded to the front end of a vane body of each guide vane, to the surface of a vane body portion located below the center of a water flowing portion of the vane body and further to upper and lower end faces of the vane body, but also an earth and sand wear resisting material softer than the said wear resisting material is sprayed or welded to the foregoing facing plates. The facing plates may be divided radially around a rotating shaft of the guide vane so that they can be disassembled and assembled in directions perpendicular to the said rotating shaft.

Thus, in the hydraulic machine constructed as above and capable of resisting wear caused by earth and sand, an earth and sand wear resisting material is sprayed or welded to the front end of a vane body of each guide vane, to the surface of a vane body portion located below the center of a water flowing portion of the vane body and further to upper and lower end faces of the vane body, that is, the said wear resisting material is applied to the minimum portion required. Therefore, the guide vane is little deformed under the influence of heat. This is economical because the unit cost of the wear resisting material in question is high. Thus, the vane body of each guide vane can be prevented from wear caused by earth and sand.

Additionally, not only an earth and sand wear resisting material is sprayed or welded to the front end of a vane body of each guide vane, to the surface of a vane body portion located below the center of a water flowing portion of the vane body and further to upper and lower end faces of the vane body, but also an earth and sand wear resisting material softer than the said wear resisting material for the guide vane is sprayed or welded to stationary-side surfaces opposed to the upper and lower end faces of the vane body, and both the earth and sand wear resisting material applied to the upper and lower end faces of the vane body and the earth and sand wear resisting material applied to the stationary-side surfaces come into sliding contact with each other. Accordingly, the guide vane and the facing plates as stationary members come into direct contact with each other, and since there are no clearances between the two, there is little loss of water pressure and the electric motor for rotating the runner does not require a large input. Consequently, the operation efficiency of the water turbine is improved and it becomes possible to attain a highly reliable power transmission system and electric power management.

DETAILED DESCRIPTION OF THE PREFERRED EMBODIMENTS

Figure 1:
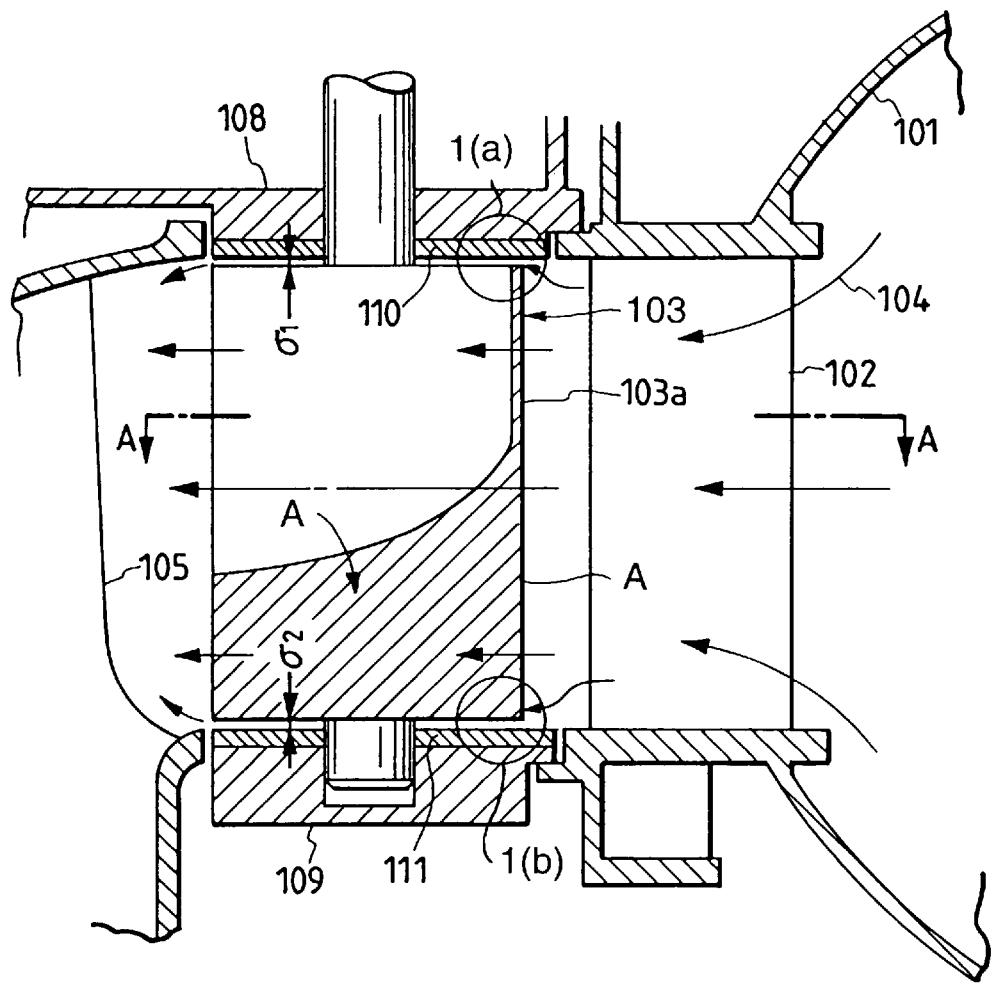
FIG. 1 is side view in vertical section, showing an earth and sand wear resisting hydraulic machine according to an embodiment of the present invention.

The present invention will be described in detail hereinunder by way of the embodiments thereof illustrated in the drawings. In FIG. 1 there is shown, in section, a principal portion of a water turbine as an earth and sand wear resisting hydraulic machine. As shown in the figure, pressurized water 104 with earth and sand mixed therein which has flowed through a water conduit pipe or a water turbine casing 101 from an upper pond passes stay vanes 102 and then reaches guide vanes 103. The pressurized water 104 is adjusted in its flow rate by the guide vanes 103 and then reaches a runner 105 to rotate the runner.

Figure 2:
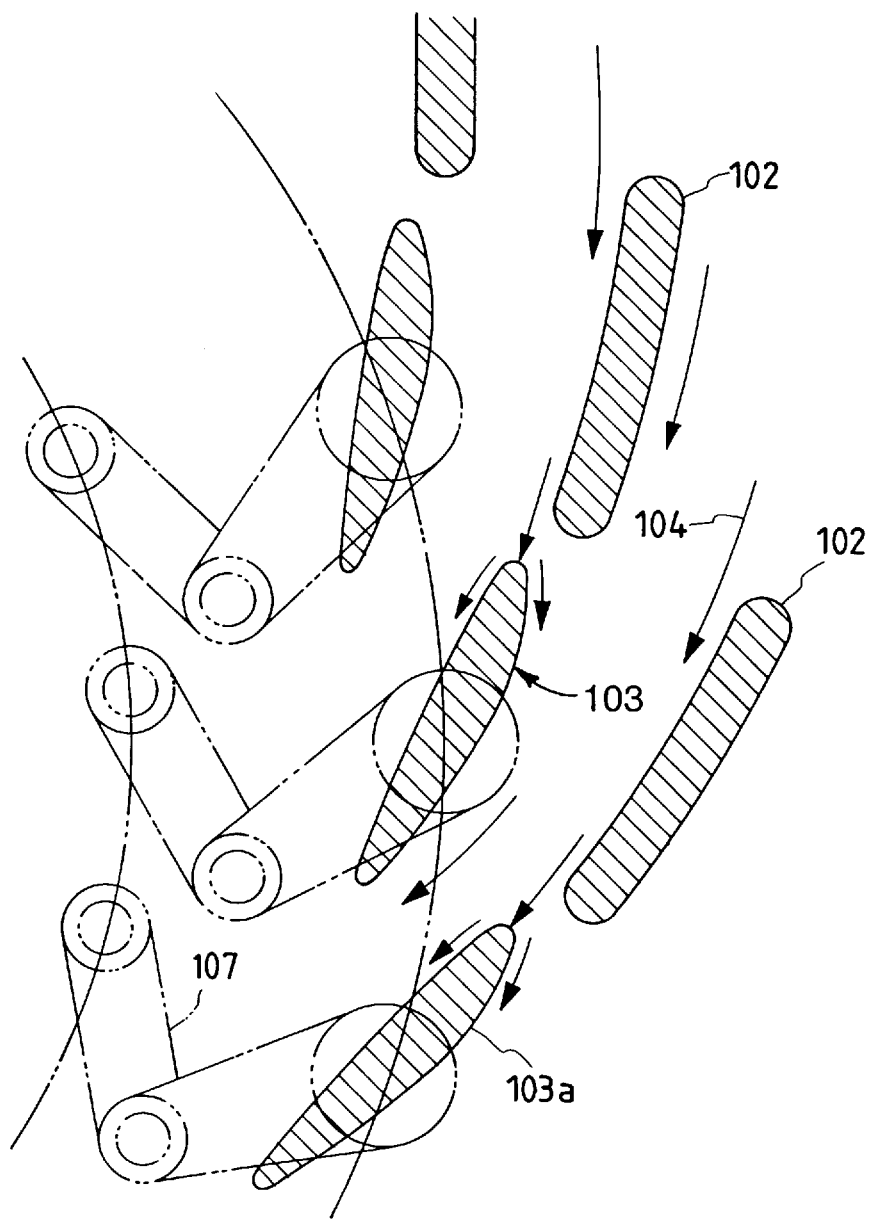
FIG. 2 is a sectional view taken on line A—A in FIG. 1.

Referring now to FIG. 2, which is a sectional view taken on line A—A in FIG. 1, each guide vane 103 has a fish-like sectional shape in which the upstream side of the vane with respect to the water flow (the arrows 104 each indicate a water flowing direction) is circular and thick, while the thickness becomes smaller toward the downstream side. This shape is adopted in view of the performance of the water turbine. The guide vanes 103 are arranged ten to twenty in number circumferentially and are movable simultaneously by means of a servo motor (not shown) and link mechanisms 107. Thus, the amount of pressurized water 104 passing between adjacent vane bodies 103a is adjusted according to the energy to be generated.

Of course, if the guide vanes 103 are fully closed, the pressurized water is shut off, the rotation of the runners 105 and that of a generator (not shown) stop, and there is performed neither power generation nor pumping-up of water. Thus, the guide vanes 103 play an important role in a hydraulic power generating machine.

Figure 1A:
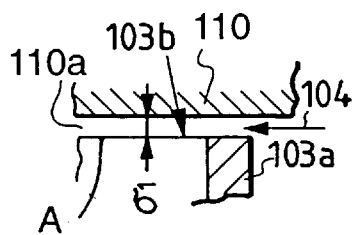
FIGS. 1(a) and 1(b) are enlarged views of zones a and b in FIG. 1.
Figure 1B:
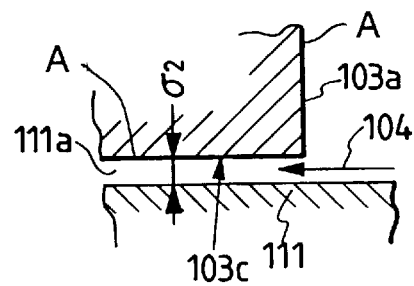

Reference is here made again to FIGS. 1(a) and 1(b). The guide vanes 103 operate in the above manner for adjusting the amount of pressurized water. In this connection, a detailed description will now be given about the guide vanes 103 and components located therearound. An upper cover 108 is provided above each guide vane 103 to support the guide vane movably, and a lower cover 109 is provided below the guide vane 103 to also support the guide vane movably. Between the guide vane 103 and the upper cover 108 and also between the guide vane and the lower cover 109 there are formed clearances σ1 and σ2, respectively, to permit movement of the guide vane.

In each guide vane of the water turbine thus constructed, an earth and sand wear resisting material A is applied by spraying to the front end of the vane body 103a, to a vane body portion located below the center of the vane body and further to upper and lower end faces 103b, 103c of the vane body.

According to experimental results, it is effective for the earth and sand wear resisting material A to have a hardness of 250 HV (Vickers' hardness) or so. Although this hardness is lower than that of earth and sand mixed in pressure water which is usually about 1,000 HV, it has turned out experimentally that the life of the guide vane applied with the wear resisting material A becomes longer by about three times that of the guide vanes not coated with such material. It is preferred that the portions to which the wear resisting material A is applied be as limited as possible.

In the water turbine constructed as above, since the portions coated with the wear resisting material A are limited to minimum required portions which are the front end of the vane body 103a, the vane body portion located below the center of the vane body 103a and the upper and lower end faces 103b, 103c of the vane body 103a, the guide vane 103 is little deformed under the influence of heat and an economic merit is obtained because the unit cost of the earth and sand wear resisting material is high. In other words, the vane body 103a can be protected economically from wear caused by earth and sand.

Figure 6:
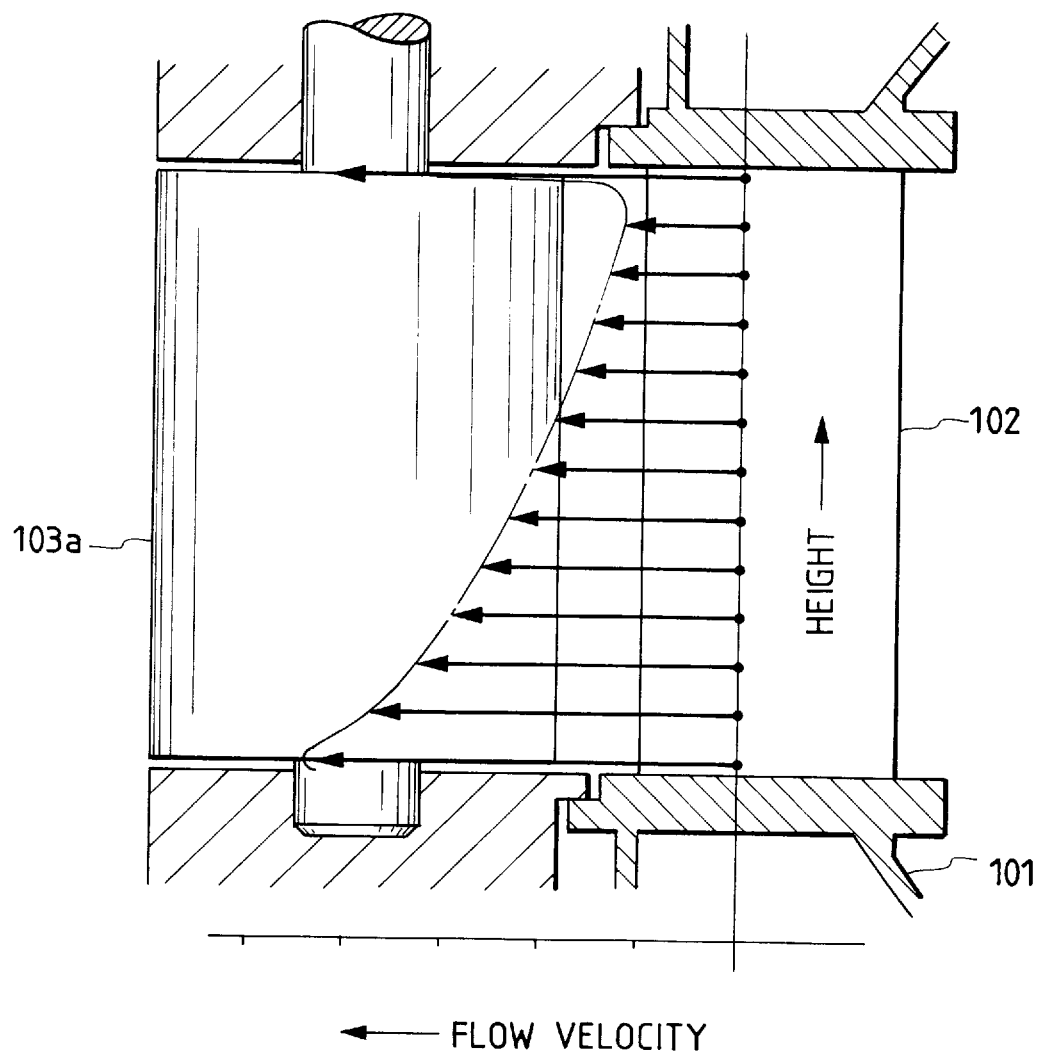
FIG. 6 is a diagram showing a water flow distribution around a guide vane.

Referring now to FIG. 6, there is shown a water flow distribution on each guide vane. As can be seen from the flow velocity distribution of the pressurized water 4 during operation for power generation, the flow velocity of the pressurized water 4 flowing from the water turbine casing 101 to the stay vanes 102 is usually proportional to the ratio in sectional area between the casing 101 and the stay vanes 102, so that the flow velocity at the stay vanes 102 becomes about three times that of the normal flow velocity. A look at the flow velocity distribution at the upper and lower portions of the vane body 103a shows that the flow velocity on the lower side with respect to the central portion of the vane body is twice to several times higher than that on the upper side. This has been made clear by a recent analysis using a computer.

Thus, the flow velocity of the pressurized water 104 passing through the upper and lower clearances σ1, σ2 between the guide vane and the upper and lower covers is very high, so that the upper and lower end faces 103b, 103c of the guide vane, as well as the upper and lower facing plates 110, 111 attached to the upper and lower covers 108, 109, respectively, are subject to wear caused by collision with earth and sand, and this wear proceeds at a high speed. Results of an actual experiment using guide vanes not subjected to the earth and sand wear resisting treatment, like the computer analysis, show that the vane body of each guide vane where the flow velocity is high, as well as the upper and lower facing plates 110, 111 where the flow velocity is also high, are worn markedly by earth and sand.

FIG. 2 is a view as seen from above, showing in which direction the pressurized water 104 flows during operation for power generation. The pressurized water 104 flows between adjacent stay vanes 102 from the water turbine casing 101 and strikes against the front end of the vane body 103a of each guide vane, then flows to both sides of the vane body. Therefore, wear and damage caused by earth and sand appear also at the front end of the vane body 103a, but in the present invention the vane body is fully protected against them.

Now, a description will be given of another embodiment of the present invention. In this embodiment, an earth and sand wear resisting material B is welded also to water flowing surfaces 110a and 111a of upper and lower facing plates 110, 111, respectively. More specifically, not only the earth and sand wear resisting material A is applied by spraying to the upper and lower end faces 103b, 103c of the vane body of each guide vane, but also the earth and sand wear resisting material B is applied by welding to the water flowing surfaces 110a and 111a of the upper and lower facing plates 110, 111. In this second embodiment, the hardness of the wear resisting material B applied to the water flowing surfaces 110a and 111a is about 400 HV and that of the wear resisting material A applied to the upper and lower end faces 103b, 103c is about 250 HV.

Since the difference in hardness (400–250) is 150 HV, there will not occur any contact damage (generally called "scuffing") even upon sliding contact between the upper and lower end faces 103b, 103c of the vane body and the water flowing surfaces 110a, 111a of the upper and lower facing plates.

Figure 3:
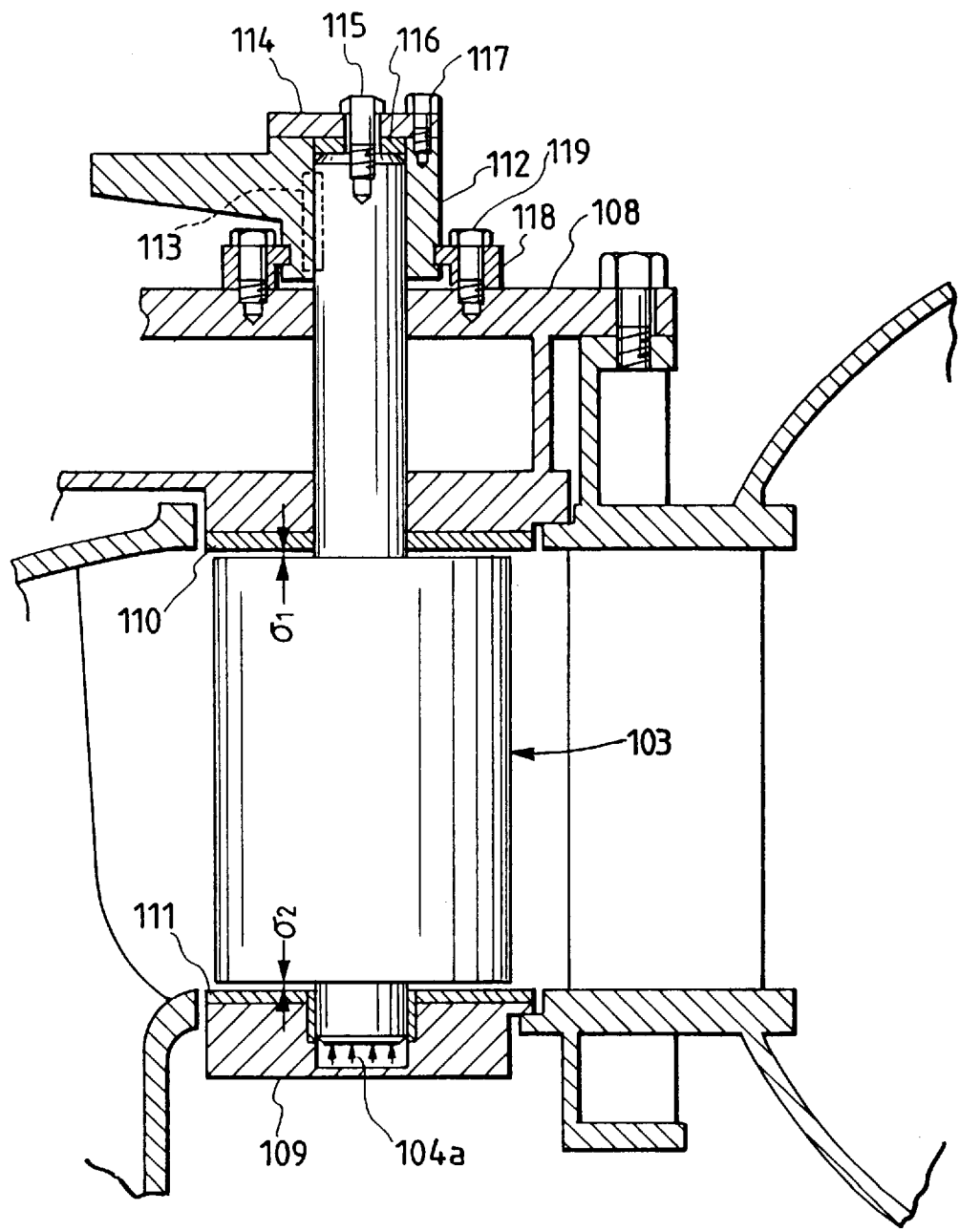
FIG. 3 is a side view in vertical section of a conventional water turbine or pump turbine.

Reference will now be made to the structure which permits contact between the upper and lower end fades 103b, 103c of the vane body and the water flowing surfaces 110a, 111a of the facing plates. FIG. 3 shows a sectional structure of a guide vane operating mechanism which is adopted in conventional water turbine and pump turbine. As mentioned above, the guide vanes 103 are movable for the adjustment of generated energy, but it is necessary for the guide vanes to be supported by another member. The guide vanes 103 are each fixed with a guide vane lever 112 and a key 113. A rotational motion of the guide vane lever 112 is transmitted to the guide vane 103. On the other hand, it is necessary to bear the own weight of the guide vane 103 and water pressure 104a exerted on the guide vane 103.

On top of the shaft of the guide vane 103 is provided a support plate 114, which is fixed to the guide vane shaft with a bolt 115 through a shim 116. The support plate 114 and the guide vane lever 112 are fixed together with a bolt 117. A thrust bearing ring 118 is fixed to the upper cover 108 with bolts 119 in a sandwiching relation to the guide vane lever 112.

With the above construction, the weight of the guide vane 103 and the water pressure 104a acting on the guide vane are borne through the thrust bearing ring 118, guide vane lever 112 and support plate 114. Between the guide vane 103 and the upper facing plate 110 and between the guide vane and the lower facing plate 111 are formed clearances σ1 and σ2, respectively, to keep the guide vane 103 movable.

Figure 4:
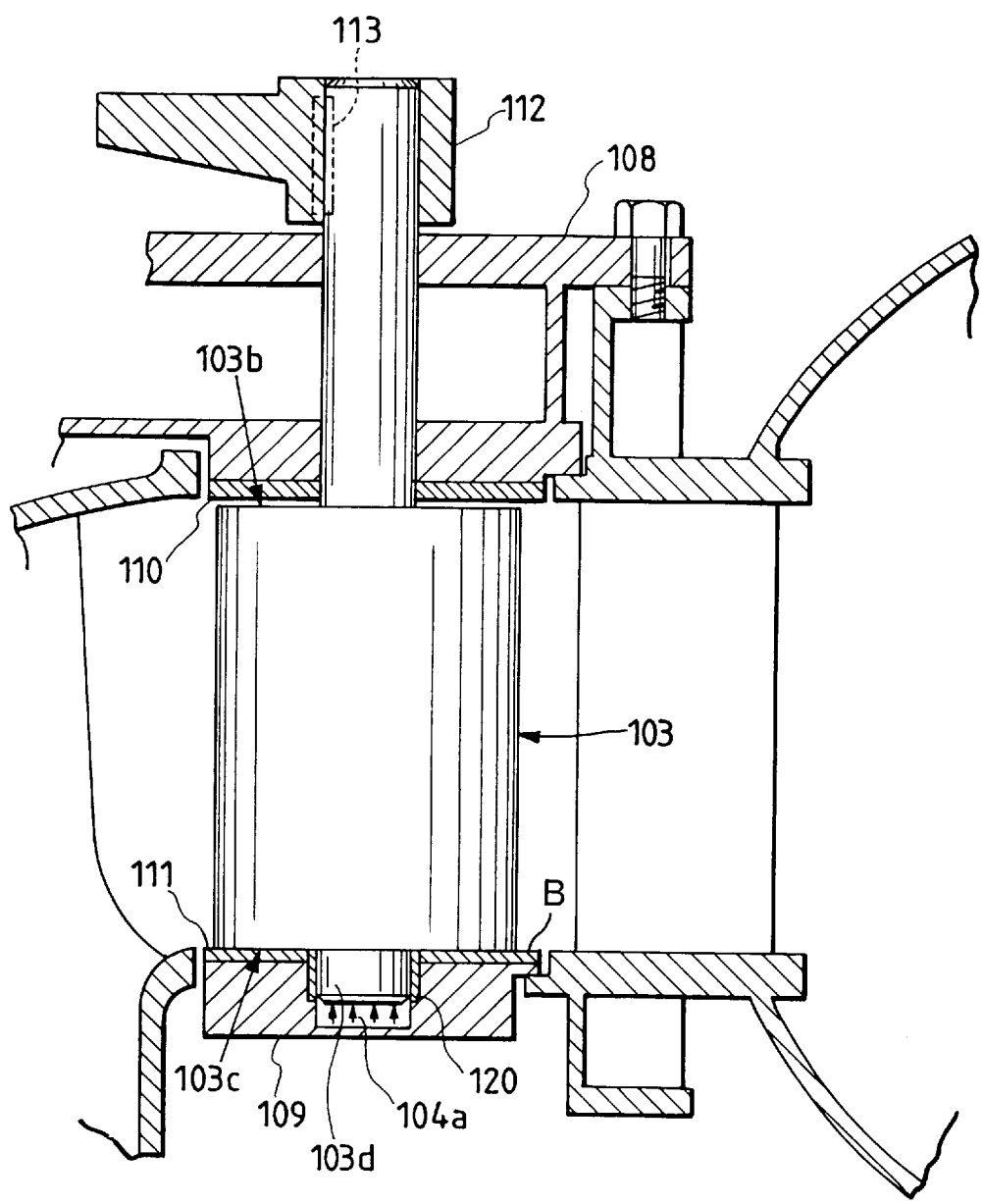
FIG. 4 is a side view in vertical section, showing a guide vane operating mechanism in an earth and sand wear resisting hydraulic machine according to another embodiment of the present invention.

On the other hand, reference is here made to FIG. 4, which shows a sectional structure of a guide vane operating mechanism used in water turbine and pump turbine according to the second embodiment of the present invention. As mentioned previously, the earth and sand wear resisting material B is welded to the water flowing surfaces of the upper and lower facing plates 108, 109 attached to the upper and lower covers 110, 111, respectively. Further, the earth and sand wear resisting material A is applied by spraying to the upper and lower end faces 103b, 103c of the vane body of each guide vane. The hardness of the wear resisting material B applied to the facing plates is 400 HV and that of the wear resisting material A applied to the upper and lower end faces 103b, 103c of the vane body is 250 HV, with a difference in hardness being 150 HV. Therefore, even upon sliding contact between the upper and lower end faces 103b, 103c of the guide vane and the water flowing surfaces of the upper and lower casings 110, 111, there will not occur any contact damage (generally called "scuffing").

By using the guide vane 103 and the lower facing plate 111 thus coated with the aforesaid wear resisting materials it becomes possible for the guide vane 103 to operate under direct contact between the guide vane and the lower facing plate. That is, the clearance σ2 formed in the conventional structure is not present. Accordingly, there is no loss of water pressure and hence it becomes possible to attain the improvement of efficiency in both water turbine operation and pumping-up operation.

On the lower end face of a lower shaft portion 103d of the guide vane is held pressure water 104 which has passed through the clearance between a lower bearing 120 and the lower shaft portion 103d of the guide vane, so that a force 104a acting to push up the guide vane 103 is developed, which force is an upward water pressure acting on the guide vane. Even if this upward water pressure causes the guide vane 103 to move and thereby causes the upper end face 103b of the vane body to come into contact with the upper facing plate 110, there will not occur any contact damage because the foregoing earth and sand wear resisting materials are used.

Further, as is seen from the construction illustrated in FIG. 4, the thrust bearing ring 118 and the support plate 114 in the guide vane operating mechanism required heretofore shown in FIG. 3 for bearing the weight of the guide vane and the water pressure can be omitted. Consequently, it becomes possible to attain a great reduction of cost and a great simplification of maintenance.

The following description is now provided about a structure according to a further embodiment of the invention in which upper and lower facing plates are each divided along lines passing through the center of the guide vane shaft of each guide vane and can be replaced without disassembly of the upper cover and the guide vane.

Figure 5:
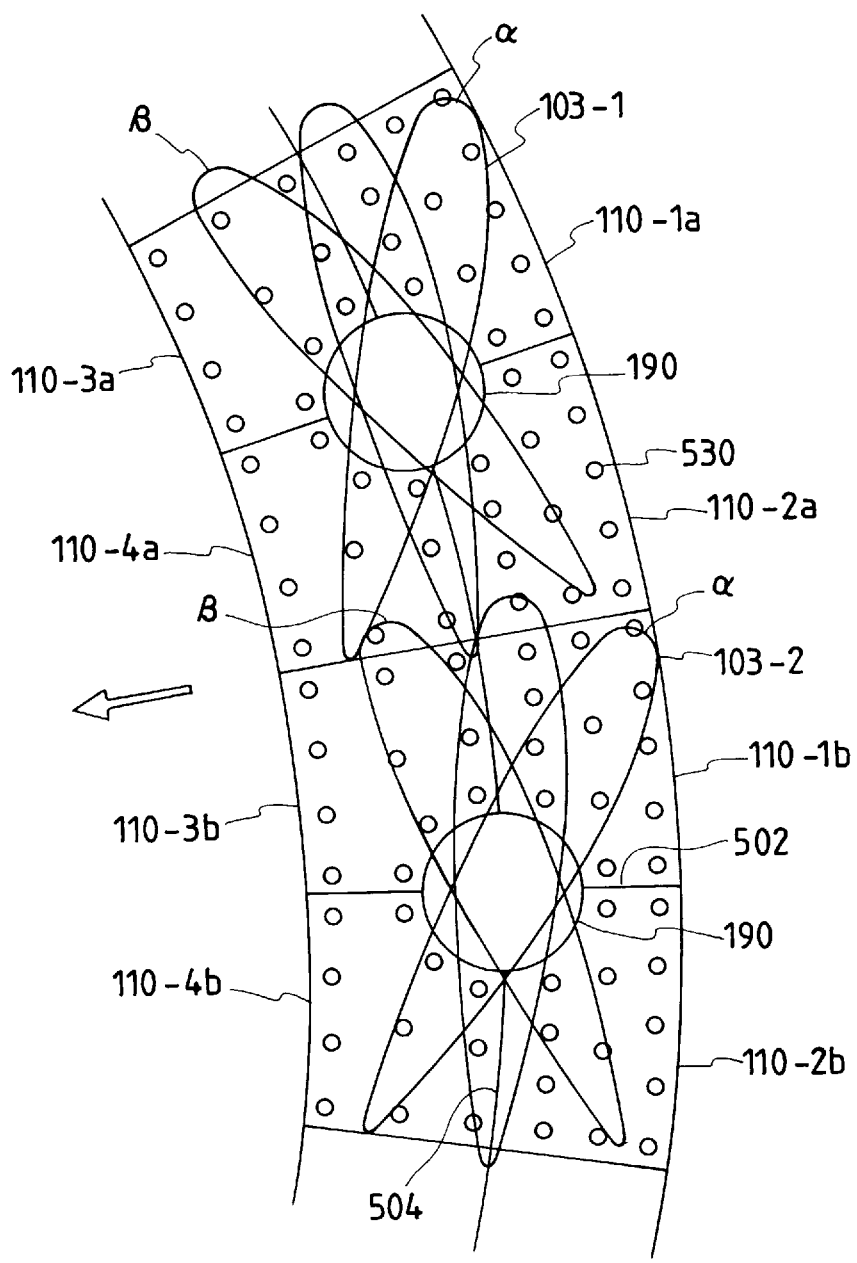
FIG. 5 is a plan view of facing plates used in the present invention.

The dividing position of the upper and lower facing plates 110, 111 adopted heretofore lies between adjacent guide vanes 103 and in the central direction of the water turbine. Usually, the upper and lower facing plates 110, 111 are fixed respectively to the upper and lower covers 108, 109 with special bolts 530 as shown in FIG. 5. According to the conventional structure just referred to above, however, since the shaft of the guide vane 103 is inserted into guide vane shaft inserting holes 190 (see FIG. 5) formed in the upper and lower facing plates 110, 111, it has heretofore been impossible to replace the upper and lower facing plates 110, 111 without disassembling the guide vane 106. In this case, for disassembling the upper cover 108, it is necessary to disassemble the generator (and generator-motor) mounted above the water turbine (and pump turbine) and most of the water turbine components. This disassembling work usually requires 120 days.

On the other hand, FIG. 5 is a facing plate mounting diagram according to the present invention. The facing plates are each formed so as to be divided toward the center of the guide vane shaft inserting hole 190 formed in the facing plate. More specifically, dividing lines 502 and 504 are provided radially from the center of the insertion hole 190. The upper and lower facing plates 110, 111 are fixed with special bolts 530 to the upper and lower covers 108, 109, respectively.

Description is now directed to the procedure for replacing the facing plates 110 and 111. Guide vanes 103-1 and 103-2 are opened to α position, then the special bolts 530 which fix the facing plates 110-2a, 110-2b and 110-3a, 110-3b are loosened, and the facing plates 110-2a, 110-2b and 110-3a, 110-3b are disassembled.

Next, the guide vane 103-2 is fixed at β position, the special bolts 530 which fix the facing plate 110-1b are loosened, and the facing plate 110-1b is disassembled. The guide vane 103-2 is fixed at α position and the guide vane 103-1 is fixed at β position. Then, the special bolts 530 which fix facing plates 110-4a are loosened and the facing plate 110-4a is disassembled.

In this way the disassembly of all the facing plates is completed while disassembling adjacent facing plates. Of course, the assembly of the facing plates is completed by reversing the above procedure. The replacement period of the facing plates 110 and 111 is one to several years particularly in the case where the earth and sand wear proceeds rapidly.

As set forth hereinabove, in the water turbine constructed as above, since the surface treatment using the earth and sand wear resisting material(s) is performed, it becomes possible to set an effective period for disassembly and inspection and hence possible to attain a great reduction of cost. Besides, since the guide vane operating mechanism can be simplified, it is possible to attain both improvement of maintainability and reduction of cost.

Moreover, the components in contact with pressure water, i.e., guide vanes and facing plates, can be fully protected against wear caused by earth and sand. Consequently, it is possible to provide a hydraulic machine capable of realizing a highly reliable power transmission system and electric power management.

Further, the hydraulic machine of the present invention is applicable to water turbine type power generation systems equipped with various water turbines and also to pumping-up type power generation systems equipped with pump turbines, e.g. Francis pump turbine.

I claim:

1. In a hydraulic machine disposed in pressurized water and having movable guide vanes, the improvement characterized in that:

a wear resisting material against earth and sand is applied by spraying or welding to only a front end of a vane body of each said guide vane, to the surface of a vane body portion located below the center of a water flowing portion of said vane body and further to upper and lower end faces of the vane body.

2. In a hydraulic machine disposed in pressurized water and having movable guide vanes, the improvement characterized in that:

a wear resisting material against earth and sand is applied by spraying or welding to a front end of a vane body of each said guide vane, to the surface of a vane body portion located below the center of a water flowing portion of said vane body and further to upper and lower end faces of the vane body; and a wear resisting material against earth and sand, which material is softer than the wear resisting material applied to said vane body, is applied by spraying or welding to stationary-side surfaces opposed to the upper and lower end faces of said vane body.

3. In a hydraulic machine disposed in pressurized water and having movable guide vanes, the improvement characterized in that:

a wear resisting material against earth and sand, having a hardness of about 400 HV, is applied by spraying or welding to a front end of a vane body of each said guide vane, to the surface of a vane body portion located lower than the center of a water flowing portion of said vane body and further to upper and lower end faces of the vane and body; and a wear resisting material against earth and sand, having a hardness of about 250 HV, is applied by spraying or welding to stationary-side surfaces opposed to the upper and lower end faces of said vane body.

4. In a hydraulic machine disposed in pressurized water and having movable guide vanes, the improvement characterized in that:

a wear resisting material against earth and sand is applied by spraying or welding to a front end of a vane body of each said guide vane, to the surface of a vane body portion located below the center of a water flowing portion of said vane body and further to upper and lower end faces of the vane body; and a soft wear resisting material against earth and sand, having a hardness lower by about 150 HV than the hardness of the wear resisting material applied to said vane body, is applied by spraying or welding to stationary-side surfaces opposed to the upper and lower end faces of said vane body.

5. In a hydraulic machine disposed in pressurized water and having movable guide vanes, the improvement characterized in that:

a wear resisting material against earth and sand is applied by spraying or welding to a front end of a vane body of each said guide vane, to the surface of a vane body portion located below the center of a water flowing portion of said vane body and further to upper and lower end faces of the vane body;

a wear resisting material against earth and sand, which is softer than the wear resisting material applied to said vane body, is applied by spraying or welding to stationary-side surfaces opposed to the upper and lower end faces of said vane body; and wherein said wear resisting material applied to the upper and lower end faces of said vane body and said wear resisting material applied to said stationary-side surfaces come into sliding contact with each other.

6. In a hydraulic machine disposed in pressurized water and having guide vanes movable between fixed facing plates, the improvement characterized in that:

a wear resisting material against earth and sand is applied by spraying or welding to a front end of a vane body of each said guide vane, to the surface of a vane body portion located below the center of a water flowing portion of said vane body and further to upper and lower end faces of the vane body; and a wear resisting material against earth and sand, which material is softer than the wear resisting material applied to said vane body, is applied by spraying or welding to said facing plates.

7. A hydraulic machine according to claim 6, wherein said facing plates are each divided radially about a rotating shaft of each said guide vane so that the facing plates can be disassembled and assembled in directions perpendicular to said rotating shaft.

8. A hydraulic machine according to claim 1 which is used in a power generating system.

9. A hydraulic machine according to claim 1 which is used in a pumping-up power generating system.

* * * * *